(12) United States Patent
Kim et al.

(10) Patent No.: US 11,101,055 B2
(45) Date of Patent: Aug. 24, 2021

(54) WIRING MEMBER

(71) Applicant: Sumitomo Wiring Systems, Ltd., Mie (JP)

(72) Inventors: Kyungwoo Kim, Mie (JP); Toshinari Kobayashi, Mie (JP); Hironobu Yamamoto, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/593,026

(22) Filed: Oct. 4, 2019

(65) Prior Publication Data
US 2020/0111587 A1    Apr. 9, 2020

(30) Foreign Application Priority Data

Oct. 9, 2018    (JP) .............................. JP2018-190692

(51) Int. Cl.
| | | |
|---|---|---|
| *B60R 16/02* | (2006.01) | |
| *H01B 7/18* | (2006.01) | |
| *H02G 3/32* | (2006.01) | |
| *H01B 7/00* | (2006.01) | |

(52) U.S. Cl.
CPC ......... *H01B 7/187* (2013.01); *B60R 16/0215* (2013.01); *H01B 7/0045* (2013.01); *H02G 3/32* (2013.01)

(58) Field of Classification Search
CPC ........ H01B 7/187; H01B 7/0045; H02G 3/32; H02G 3/0487; H02G 3/305; B60R 16/0215; F16B 21/086; F16B 5/0642; F16B 11/006
See application file for complete search history.

(56) References Cited

U.S. PATENT DOCUMENTS

| | | | | |
|---|---|---|---|---|
| 2,933,550 | A | * | 4/1960 | Judson ................. H01R 13/504 174/76 |
| 4,778,948 | A | * | 10/1988 | Fitch ....................... H01R 4/72 156/49 |
| 2006/0219423 | A1 | * | 10/2006 | Suzuki ................ B60R 16/0215 174/72 A |
| 2010/0218976 | A1 | * | 9/2010 | Suzuki ................ B60R 16/0215 174/135 |

(Continued)

OTHER PUBLICATIONS

Definition of Polypropylene (PP), omnexus.specialchem.com (Year: 2020).*

*Primary Examiner* — Steven T Sawyer
(74) *Attorney, Agent, or Firm* — Honigman LLP (57) ABSTRACT

A wiring member is provided with a plurality of electrical wires and a resin molded part. In the plurality of electrical wires, a first bundled wire part branches into a first branched wire part and a second bundled wire part at a first branch position, and the second bundled wire part branches into a second branched wire part and a third branched wire part at a second branch position. The resin molded part includes a first maintaining part and a second maintaining part that are integrally formed. The first maintaining part covers the electrical wires at the first branch position, and maintains an extension direction of the first branched wire part. The second maintaining part covers the electrical wires at the second branch position, and maintains extension directions of the second branched wire part and the third branched wire part.

13 Claims, 4 Drawing Sheets

(56) References Cited

U.S. PATENT DOCUMENTS

| | | | |
|---|---|---|---|
| 2013/0168129 A1* | 7/2013 | Cox | H01B 17/00 |
| | | | 174/135 |
| 2013/0292159 A1* | 11/2013 | Gotou | H02G 3/305 |
| | | | 174/250 |
| 2014/0076628 A1* | 3/2014 | McGrath | H01B 7/0045 |
| | | | 174/84 R |
| 2015/0175095 A1* | 6/2015 | Inao | B60R 16/0207 |
| | | | 174/720 |
| 2016/0134089 A1* | 5/2016 | Peterson | H02G 3/0487 |
| | | | 174/72 A |
| 2017/0246998 A1* | 8/2017 | Ogue | B60R 16/0215 |
| 2017/0313265 A1 | 11/2017 | Shimizu et al. | |
| 2019/0071036 A1 | 3/2019 | Shimizu et al. | |
| 2019/0109447 A1* | 4/2019 | Patz | H02G 15/10 |
| 2019/0351845 A1* | 11/2019 | Toyoshima | H01R 13/5205 |

* cited by examiner

WIRING MEMBER

CROSS-REFERENCE TO RELATED APPLICATIONS

This application claims priority of Japanese Patent Application No. JP 2018-190692 filed on Oct. 9, 2018, the contents of which are incorporated herein.

TECHNICAL FIELD

This disclosure relates to a wiring member.

BACKGROUND ART

JP 2016-91731A discloses a technology in which an ABS sensor cable and a parking brake cable provided in a compound harness branch from an end part of a sheath in the compound harness, and a molded part is provided in the branch portion to fix the lead-out direction of the cables.

In JP 2016-91731A, there are two branching cables, namely, the ABS sensor cable and the parking brake cable, but the case is also possible where there are three or more branching cables. In this case, when three or more cables branch from one branch position, there is a chance that the degree of freedom of the extension directions of the three or more cables will be reduced.

It is thus an object of the present disclosure to provide a technology that is able to increase the degree of freedom of extension directions of three or more branch wires.

SUMMARY

To solve the above-described problem, a first aspect of the disclosure is a wiring member in which a first bundled wire part that bundles a plurality of electrical wires branches into a first branched wire part and a second bundled wire part at a first branch position, and the second bundled wire part branches into a second branched wire part and a third branched wire part at a second branch position, the wiring member including a resin molded part including a first maintaining part that covers the electrical wires at the first branch position, and maintains an extension direction, at the first branch position, of the first branched wire part, and a second maintaining part that covers the electrical wires at the second branch position, and maintains the extension direction, at the second branch position, of the second branched wire part and the third branched wire part, the first maintaining part and the second maintaining part being integrally formed.

A second aspect of the disclosure is the wiring member according to the first aspect, further including a sheath that covers the plurality of electrical wires, and in which the first maintaining part covers an end part of the sheath.

A third aspect of the disclosure is the wiring member according to the first or second aspect, in which a connection part to which an attachment member for attaching the wiring member to an attachment target is to be connected is formed in the resin molded part.

A fourth aspect of the disclosure is the wiring member according to any one of the first to third aspects, in which the extension direction of the first branched wire part maintained by the first maintaining part and the extension direction of the second branched wire part or the third branched wire part maintained by the second maintaining part are parallel.

A fifth aspect of the disclosure is the wiring member according to any one of the first to third aspects, in which the extension direction of the first branched wire part maintained by the first maintaining part and the respective extension directions of the second branched wire part and the third branched wire part maintained by the second maintaining part are all different directions.

According to the aspects, the first branched wire part and the second and third branched wire parts branch at different branch positions while the extension directions are maintained with one resin molded part. Thus, the degree of freedom of the extension directions of the second branched wire part and third branched wire part with respect to the first branched wire part can be increased.

According to the second aspect, the end part of the sheath can be waterproofed by the first maintaining part.

According to the third aspect, the connection part can be provided integrally with the resin molded part.

According to the fourth aspect, the first branched wire part and the second or third branched wire part can be extended in parallel.

According to the fifth aspect, the first branched wire part, the second branched wire part and the third branched wire part can be extended in respectively different directions.

EMBODIMENTS OF THE DISCLOSURE

Figure 1:
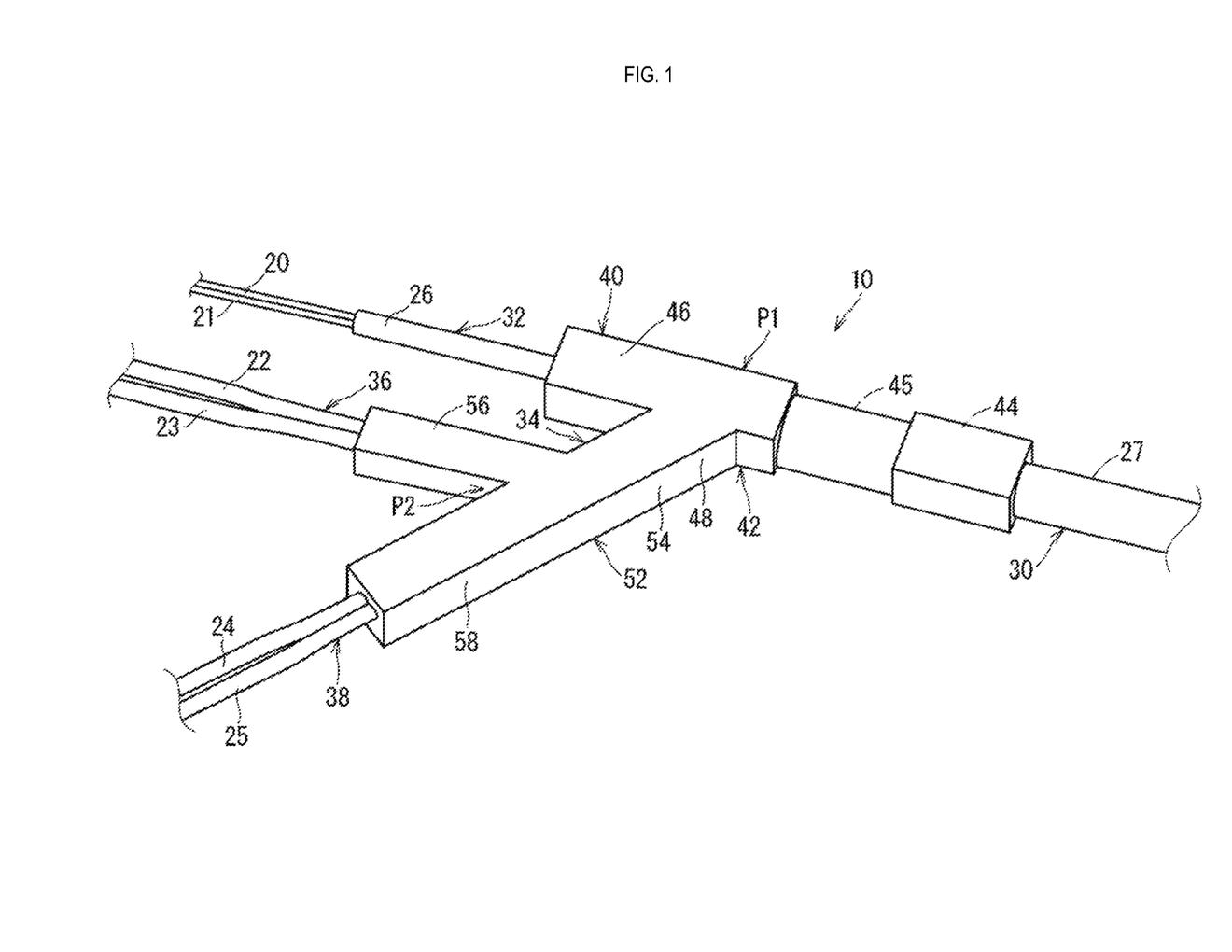
FIG. 1 is a perspective view showing a wiring member according to an embodiment.
Figure 2:
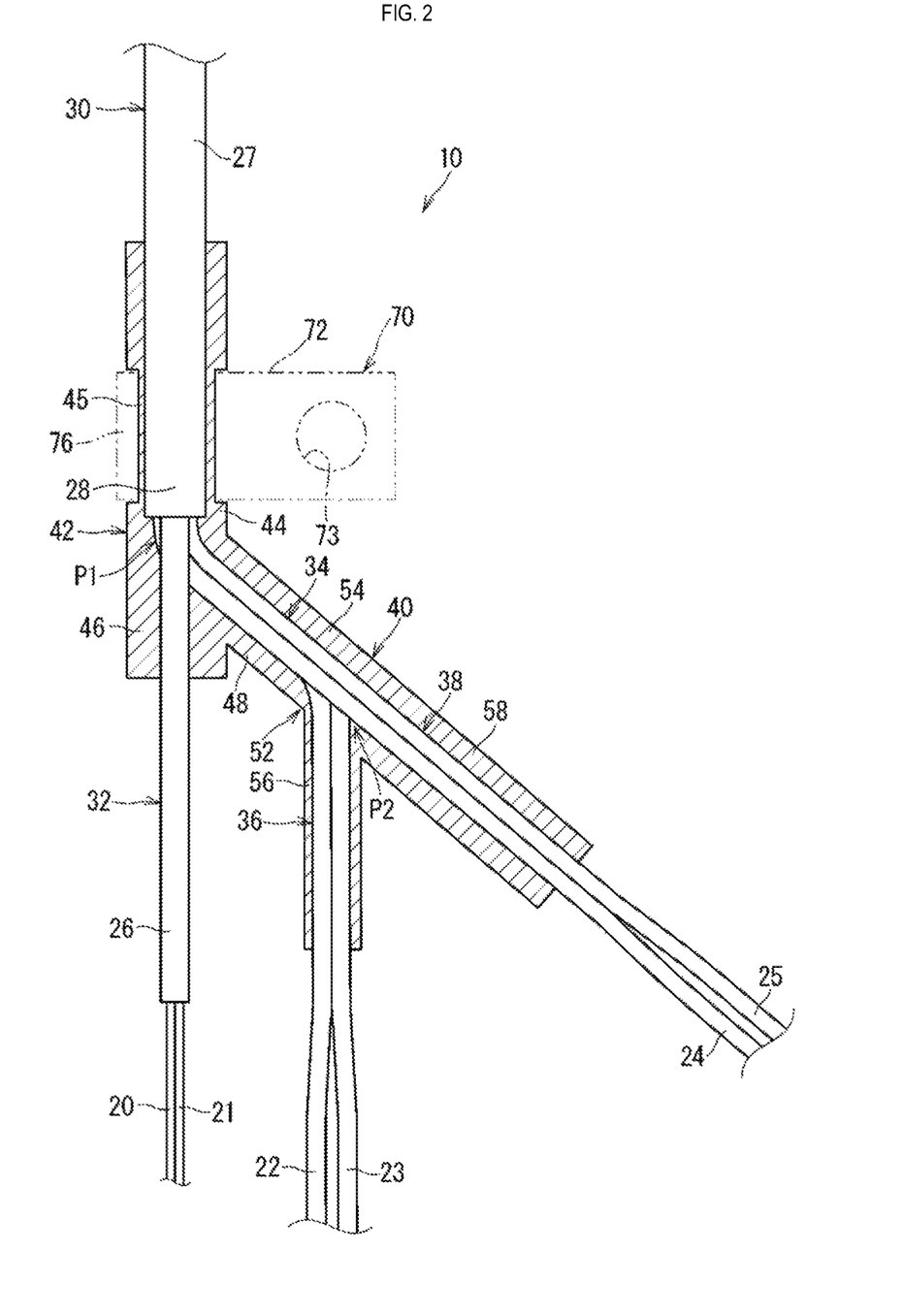
FIG. 2 is a longitudinal sectional view showing the wiring member according to the embodiment.

Hereinafter, a wiring member according to an embodiment will be described. FIG. 1 is a perspective view showing a wiring member 10 according to the embodiment. FIG. 2 is a longitudinal sectional view showing the wiring member 10 according to the embodiment. Note that electrical wires and a sheath covering the electrical wires are not shown in sectional view in FIG. 2. This similarly applies to the other longitudinal sectional view described below.

The wiring member 10 is provided with a plurality of electrical wires 20, 21, 22, 23, 24 and 25 and a resin molded part 40.

The electrical wires 20 and 21 are provided with a core wire and a coating that surrounds the core wire. The core wire is a conductive wire formed by copper, a copper alloy, aluminum, an aluminum alloy or the like. The core wire may be a solid wire or may be a stranded wire. The coating is an insulating coating formed by a resin or the like, and is formed by performing a technique such as extrusion coating of a resin around the core wire. The electrical wires 20 and 21 are, for example, signal lines for performing signal transmission. In the case where the wiring member 10 is mounted in a vehicle, for example, the electrical wires 20 and 21 can serve as signal lines for transmitting signals from sensors (illustration omitted) for detecting the speed of the wheels in an anti-lock brake system (ABS). Note that the tip parts of the electrical wires 20 and 21 are omitted in FIGS. 1 and 2.

The electrical wires 22, 23, 24 and 25 are provided with a core wire and a coating that surrounds the core wire, similarly to the electrical wires 20 and 21. For example, the electrical wires 22, 23, 24 and 25 are power supply lines for transmitting power. For example, in the case where the wiring member 10 is mounted in a vehicle, the electrical wires 22, 23, 24 and 25 can serve as power supply lines for supplying power to an electric parking brake (EPB) or the like. Note that the tip parts of the electrical wires 22, 23, 24 and 25 are omitted in FIGS. 1 and 2.

The plurality of electrical wires 20, 21, 22, 23, 24 and 25 are surrounded by a sheath 27 (also called a jacket, etc.). The sheath 27 is an insulating coating formed by a resin or the like, and is formed by performing a technique such as extrusion coating of a resin around the plurality of electrical wires 20, 21, 22, 23, 24 and 25. The sheath 27 may be omitted.

The sheath 27 covers a portion of the plurality of electrical wires 20, 21, 22, 23, 24 and 25 near one end (upper portion in FIG. 2). The sheath 27 has an end part 28 from which the plurality of electrical wires 20, 21, 22, 23, 24 and 25 are exposed, at an intermediate position of the plurality of electrical wires 20, 21, 22, 23, 24 and 25 in the extending direction. The plurality of electrical wires 20, 21, 22, 23, 24 and 25 are bundled into one by the sheath 27 in the portion where the sheath 27 is provided.

The plurality of electrical wires 20, 21, 22, 23, 24 and 25 extend from the end part 28 of the sheath 27 and branch in multiple directions. Here, the plurality of electrical wires 20, 21, 22, 23, 24 and 25 branch in two, namely, into the electrical wires 20 and 21 and the electrical wires 22, 23, 24 and 25, at a first branch position P1. Also, the electrical wires 22, 23, 24 and 25 branch in two, namely, into the electrical wires 22 and 23 and the electrical wires 24 and 25, at a second branch position P2.

In the following description, the portion bundled by the sheath 27 in the portion near one end of the electrical wires 20, 21, 22, 23, 24 and 25 may be referred to as a first bundled wire part 30. Also, the respective portions of the electrical wires 20 and 21 and the electrical wires 22, 23, 24 and 25, among the electrical wires 20, 21, 22, 23, 24 and 25, that extend from the end part 28 of the sheath 27 and branch in two at the first branch position P1 may be referred to as a first branched wire part 32 and a second bundled wire part 34. Also, the respective portions of the electrical wires 22 and 23 and the electrical wires 24 and 25, among the electrical wires 22, 23, 24 and 25, that branch in two at the second branch position P2 may be referred to as a second branched wire part 36 and a third branched wire part 38.

Here, the first branched wire part 32, the second branched wire part 36 and the third branched wire part 38 extend in one plane. At this time, the first branched wire part 32 and the second branched wire part 36 extend in parallel, and the third branched wire part 38 extends in a direction intersecting therewith. Furthermore, here, the first bundled wire part 30, the first branched wire part 32, the second bundled wire part 34, the second branched wire part 36 and the third branched wire part 38 extend in one plane.

Also, the first bundled wire part 30, the first branched wire part 32, the second bundled wire part 34, the second branched wire part 36 and the third branched wire part 38 do not bend other than at the branch positions. Naturally, the first bundled wire part 30, the first branched wire part 32, the second bundled wire part 34, the second branched wire part 36 and the third branched wire part 38 may have a bent portion other than at the branch positions, and, furthermore, this bent portion may be covered with the resin molded part 40 and the routing thereof maintained.

A coating layer 26 (also called a sheath, etc.) is formed around the electrical wires 20 and 21. Accordingly, a cable having the plurality of coated electrical wires 20 and 21 and the coating layer 26 that surrounds the plurality of coated electrical wires 20 and 21 is used as the electrical wires constituting the first branched wire part 32. This cable extends inside the sheath 27. In contrast, the electrical wires 22, 23, 24 and 25 are used singly as the electrical wires constituting the second bundled wire part 34. Accordingly, the sheath 27 covers the four single electrical wires 22, 23, 24 and 25 and one cable. Of course, one or a plurality of single coated electrical wires without the coating layer 26 may be used as the electrical wires constituting the first branched wire part 32, similarly to the electrical wires 22, 23, 24 and 25 constituting the second bundled wire part 34. Also, a cable in which a plurality of coated electrical wires are covered with the coating layer 26 may be employed as the electrical wires constituting the second bundled wire part 34. In the case where a cable is employed as the electrical wires constituting the second bundled wire part 34, the electrical wires may be constituted to extend from the end part of the coating layer 26 at the second branch position P2.

The resin molded part 40 includes a first maintaining part 42 and a second maintaining part 52. The resin molded part 40 is integrally molded.

The first maintaining part 42 covers the end part 28 of the sheath 27 and a base end part of the plurality of electrical wires 20, 21, 22, 23, 24 and 25 that branch from the end part 28 of the sheath 27. In other words, the first maintaining part 42 is provided with a first bundled wire covering part 44 that covers the tip part of the first bundled wire part 30 (here, end part 28 of sheath 27), a first branched wire covering part 46 that covers the base end part of the first branched wire part 32 (here, portion of first branched wire part 32 near end part 28 of sheath 27), and a second bundled wire covering part 48 that covers the base end part of the second bundled wire part 34 (here, portion of second bundled wire part 34 near end part 28 of sheath 27).

A connection part 45 is formed in the first bundled wire covering part 44. The outer shape of the first bundled wire covering part 44, excluding the portion where the connection part 45 is formed, is formed to be square, although this is not essential, and the outer shape may be formed to be circular or the like. This similarly applies to other portions of the resin molded part 40.

The connection part 45 is a portion to which an attachment member 70 is connected. The connection part 45 is narrower than other portions of the first bundled wire covering part 44, and external mounting of the attachment member 70 is facilitated. The connection part 45 is formed in a portion of the first bundled wire covering part 44 that covers the sheath 27. In particular, here, the connection part 45 is formed so as to be located toward an intermediate part of the sheath 27 from the edge of the end part 28. The thickness of the portion of the first bundled wire covering part 44 that covers the edge of the end part 28 of the sheath 27 can thereby be increased.

The first branched wire covering part 46 and the second bundled wire covering part 48 are continuously provided on the tip side of the first bundled wire covering part 44. The first branched wire covering part 46 extends as a continuation of the first bundled wire covering part 44. The second bundled wire covering part 48 extends in a direction that intersects the first bundled wire covering part 44 and the first branched wire covering part 46. Naturally, the second bundled wire covering part 48 may extend as a continuation of the first bundled wire covering part 44, and the first branched wire covering part 46 may extend in a direction that intersects the first bundled wire covering part 44 and the second bundled wire covering part 48. Also, the first bundled wire covering part 44, the first branched wire covering part 46 and the second bundled wire covering part 48 may extend so as to intersect each other. The first branched wire covering part 46 maintains the extension direction of the first branched wire part 32. The second bundled wire covering part 48 maintains the extension direction of the second bundled wire part 34. The first branched wire covering part 46 and the second bundled wire covering part 48 cover fewer electrical wires compared with the first bundled wire covering part 44. Thus, the first branched wire covering part 46 and the second bundled wire covering part 48 may be formed more narrowly than the first bundled wire covering part 44. Of course, the first branched wire covering part 46 and the second bundled wire covering part 48 may be formed to be the same as or thicker than the first bundled wire covering part 44.

The first maintaining part 42 is configured to retain the shape of the branch portion of the electrical wires 20, 21, 22, 23, 24 and 25 (routing maintenance), waterproof the end part 28 of the sheath 27, and the like. In particular, the portion of the first maintaining part 42 that is formed thickly compared with the connection part 45 mainly acts to retain the shape of the branch portion of the electrical wires 20, 21, 22, 23, 24 and 25 (routing maintenance), waterproof the end part 28 of the sheath 27, and the like. By waterproofing the end part 28 of the sheath 27 with the first maintaining part 42, infiltration of water or the like into the sheath 27 through the opening in the end part 28 of the sheath 27 can be prevented.

The second maintaining part 52 covers the tip part of the second bundled wire part 34 and the base end part of the plurality of electrical wires 22, 23, 24 and 25 that branch from the tip part of the second bundled wire part 34. In other words, the second maintaining part 52 is provided with a second bundled wire covering part 54 that covers the tip part of the second bundled wire part 34, a second branched wire covering part 56 that covers the base end part of the second branched wire part 36 (here, portion of second branched wire part 36 near tip part of second bundled wire part 34), and a third branched wire covering part 58 that covers the base end part of the third branched wire part 38 (here, portion of third branched wire part 38 near tip part of second bundled wire part 34).

The second bundled wire covering part 54 of the second maintaining part 52 extends as a continuation of the second bundled wire covering part 48 of the first maintaining part 42. Naturally, the second bundled wire covering part 54 of the second maintaining part 52 may extend in a direction that intersects the second bundled wire covering part 48 of the first maintaining part 42. The second branched wire covering part 56 and the third branched wire covering part 58 are continuously provided on the tip side of the second bundled wire covering part 54. The third branched wire covering part 58 extends as a continuation of the second bundled wire covering part 54. The second branched wire covering part 56 extends in a direction that intersects the second bundled wire covering part 54 and the third branched wire covering part 58. Naturally, the second bundled wire covering part 54, the second branched wire covering part 56 and the third branched wire covering part 58 may extend so as to intersect each other. The second branched wire covering part 56 extends in a direction parallel to the first branched wire covering part 46. The second branched wire covering part 56 maintains the extension direction of the second branched wire part 36. The third branched wire covering part 58 maintains the extension direction of the third branched wire part 38. The second branched wire covering part 56 and the third branched wire covering part 58 cover fewer electrical wires compared with the second bundled wire covering part 54. Thus, the second branched wire covering part 56 and the third branched wire covering part 58 are formed more narrowly than the second bundled wire covering part 54.

The second maintaining part 52 is configured to retain the shape of the branch portion of the electrical wires 22, 23, 24 and 25 (routing maintenance). Furthermore, here, the first maintaining part 42 and the second maintaining part 52 are directly joined. More specifically, here, the first maintaining part 42 and the second maintaining part 52 are directly joined, due to the second bundled wire covering part 48 of the first maintaining part 42 and the second bundled wire covering part 54 of the second maintaining part 52 being joined. Accordingly, here, the routing of the second bundled wire part 34 is maintained throughout its length by the first maintaining part 42 and the second maintaining part 52. Note that the second bundled wire covering part 48 formed in the first maintaining part 42 can be taken as a second bundled wire base end covering part. Similarly, the second bundled wire covering part 54 formed in the second maintaining part 52 can be taken as a second bundled wire tip covering part.

Here, the first branched wire covering part 46, the second branched wire covering part 56 and the third branched wire covering part 58 maintain the extension direction of the first branched wire part 32, the second branched wire part 36 and the third branched wire part 38 such that the three branched wire parts 32, 36 and 38 extend in one plane, such that the first branched wire part 32 and the second branched wire part 36 extend in parallel, and the third branched wire part 38 extends in a direction intersecting therewith. At this time, the first branched wire covering part 46 maintains the extension direction of the first branched wire part 32, such that the first branched wire part 32 extends as a continuation of the first bundled wire part 30. Also, the third branched wire covering part 58 maintains the extension direction of the third branched wire part 38, such that the third branched wire part 38 extends as a continuation of the second bundled wire part 34. Of course, the third branched wire part 38 may extend in a direction that intersects the second bundled wire part 34.

The first branched wire covering part 46, the second branched wire covering part 56 and the third branched wire covering part 58 respectively cover the first branched wire part 32, the second branched wire part 36 and the third branched wire part 38 to an intermediate part thereof. The first branched wire covering part 46, the second branched wire covering part 56 and the third branched wire covering part 58 are formed to a size that depends on the intermediate part of the first branched wire part 32, the second branched wire part 36 and the third branched wire part 38. Naturally, the first branched wire covering part 46, the second branched wire covering part 56 and the third branched wire covering part 58 may respectively cover the first branched wire part 32, the second branched wire part 36 and the third branched wire part 38 to a terminal part thereof.

A resin molded part 40 such as described above can, for example, be formed by a resin such as a urethane resin. Specifically, a resin molded part 40 such as described above can, for example, be integrally formed by insert molding, using an injection mold, with the end part of the first bundled wire part 30 (here, end part 28 of sheath 27), the base end part of the first branched wire part 32, the second bundled wire part 34, the base end part of the second branched wire part 36 and the third branched wire part 38 as insert target portions. In other words, the resin molded part 40 is a molded component. This first maintaining part 42 seals the opening in the end part 28 of the sheath 27, in a state of liquid-tight contact with the outer perimeter surface of the sheath 27, the outer perimeter surface of the first branched wire part 32 (here, outer perimeter surface of coating layer 26), and the outer perimeter surface of the second bundled wire part 34 (here, outer perimeter surface of coating of electrical wires 22, 23, 24, 25).

Figure 4:
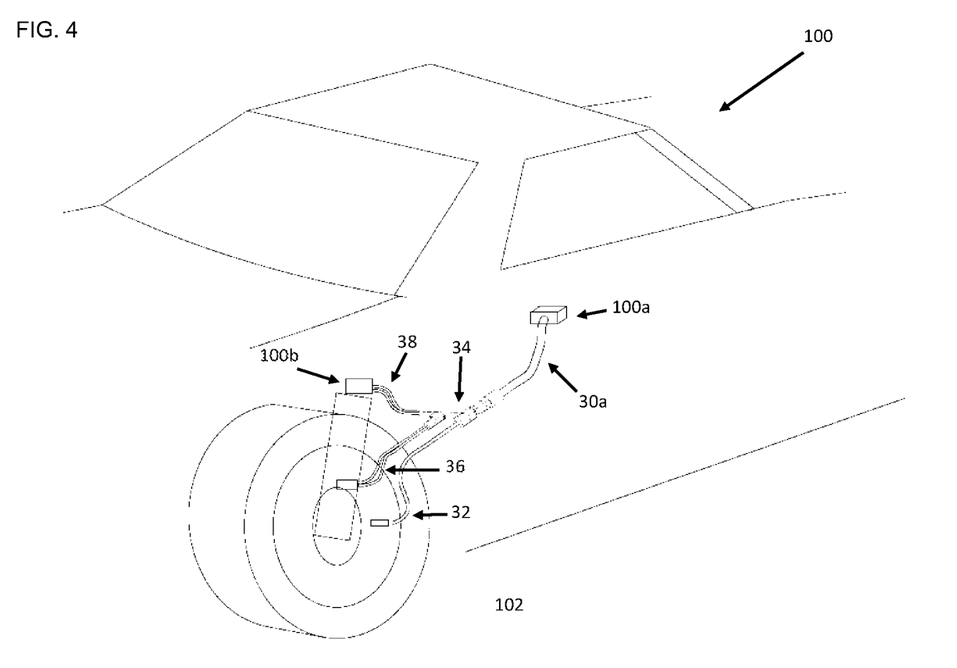
FIG. 4 a schematic view showing the wiring member attached to a vehicle.

The attachment member 70 for attaching the wiring member 10 to an attachment target is provided on the resin molded part 40 (here, first maintaining part 42). The attachment target is a vehicle, for example. For example, in the case where this wiring member 10 is mounted in a vehicle 100, and the electrical wires 20, 21, 22, 23, 24 and 25 are for use with sensors that detect the rotation speed of the wheels 102, an EPB and the like, one end part 30a of the wiring member 10 is connected to a site 100a on the vehicle body side and the other end part (tip parts of first branched wire part 32, second branched wire part 36 and third branched wire part 38) is connected to a site 100b on the wheel side 102. Also, the attachment member 70 is attached to the vehicle body and supports an intermediate part of the wiring member 10 in a fixed position.

The connection part 45 is formed in the first maintaining part 42, as described above. The connection part 45 is provided in the first bundled wire covering part 44. The connection part 45 is narrower than other portions of the first bundled wire covering part 44, and is provided with the attachment member 70 in an externally mountable manner.

The attachment member 70 includes a first attachment part 72 and a second attachment part 76. The first attachment part 72 is the portion that is attached to an attachment target such as a vehicle. The second attachment part 76 is the portion that is attached to the first maintaining part 42. A configuration is adopted in which the first attachment part 72 is formed to be plate-like, and has a through hole 73 formed therein for fastening a bolt to be attached to the attachment target by tightening or the like. The second attachment part 76 is formed to be plate-like and is connected to the first maintaining part 42 by being crimped to the connection part 45. The attachment member 70 is a member integrally molded using a resin, a metal or the like, and is also called a bracket or the like.

According to the wiring member 10 constituted as described above, the first branched wire part 32 and the second and third branched wire parts 36 and 38 branch at different branch positions, while the extension directions thereof are maintained by a single resin molded part 40. Thus, the degree of freedom of the extension directions of the second branched wire part 36 and the third branched wire part 38 with respect to the first branched wire part 32 can be increased. For example, in the wiring member 10, the extension direction of the first branched wire part 32 maintained by the first maintaining part 42 and the extension direction of the second branched wire part 36 maintained by the second maintaining part 52 are parallel, thus enabling the first branched wire part 32 and the second branched wire part 36 to be extended in parallel. At this time, a single resin molded part 40 maintains the extension directions of the first branched wire part 32, the second branched wire part 36 and the third branched wire part 38, and thus a maintaining member can be readily provided. Also, since the second bundled wire part 34 is covered by the resin molded part 40, exposure of the second bundled wire part 34 is suppressed. Also, since the second bundled wire part 34 is maintained by the resin molded part 40, the extension directions of the second branched wire part 36 and the third branched wire part 38 with respect to the extension direction of the first branched wire part 32 can be maintained with high accuracy.

Also, since the connection part 45 is formed in the resin molded part 40, the connection part 45 can be provided integrally with the resin molded part 40.

Also, since the first maintaining part 42 covers the end part 28 of the sheath 27, the end part 28 of the sheath 27 can be waterproofed by the first maintaining part 42. In other words, a waterproofing part and the connection part 45 can be integrally molded. In particular, the second branched wire part 36 and the third branched wire part 38 branch at the second branch position P2. Thus, the number of branches at the first branch position P1 is reduced. The narrow space around the end part 28 of the sheath 27 is thereby reduced. As a result, waterproofing of the end part 28 of the sheath 27 is facilitated, by improvement in the running of resin at the time of resin molding.

Variations

The embodiment describes the plurality of electrical wires 20, 21, 22, 23, 24 and 25 as branching at two branch positions, but this is not an essential configuration. The plurality of electrical wires may branch at three or more branch positions. Also, the embodiment describes the plurality of electrical wires 20, 21, 22, 23, 24 and 25 as branching in two at the first branch position P1, but this is not an essential configuration. The plurality of electrical wires may branch in three or more at the first branch position P1. This similarly applies to other branch positions.

Figure 3:
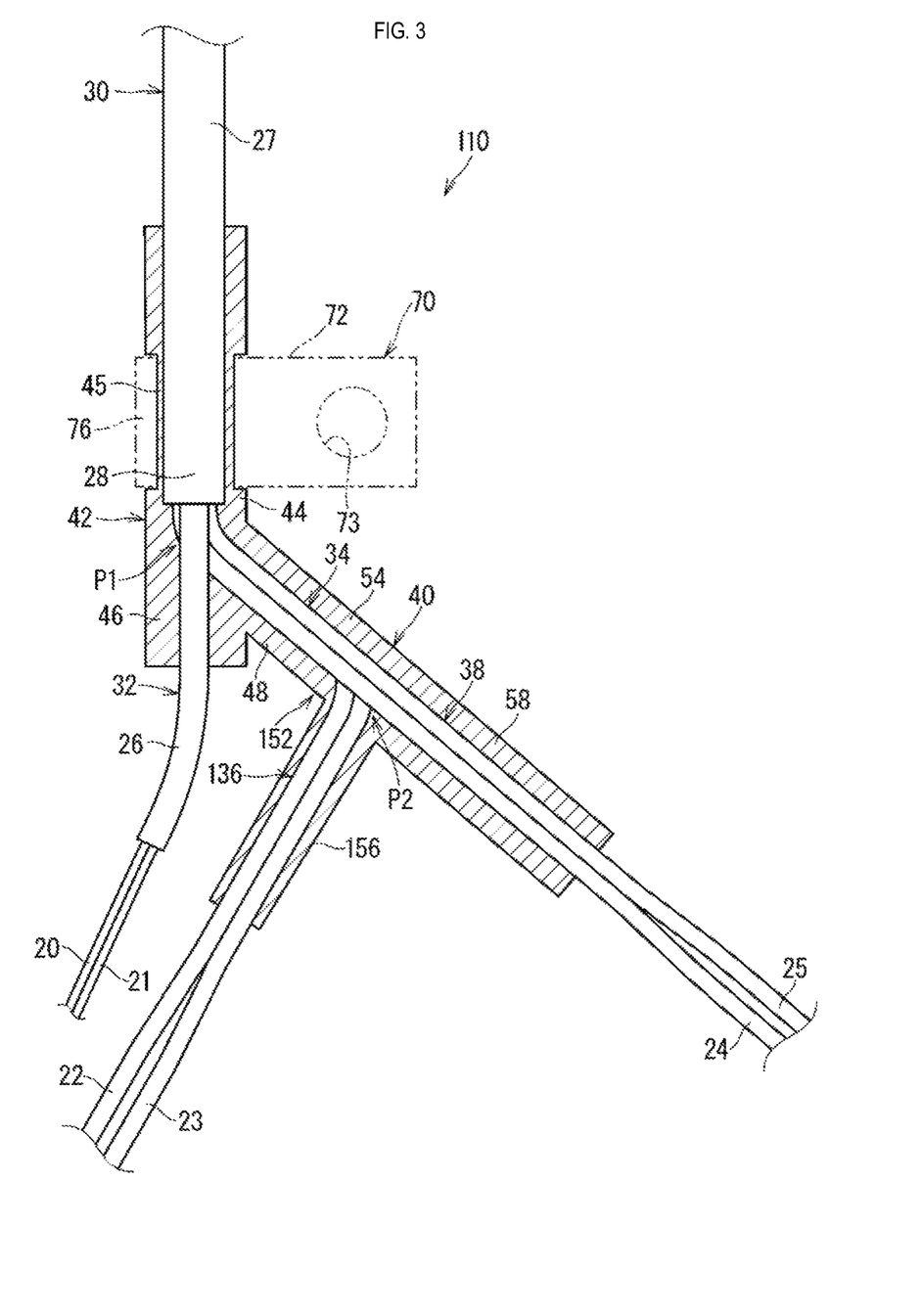
FIG. 3 is a longitudinal sectional view showing a variation of the wiring member.

Also, the embodiment describes the extension direction of the second branched wire part 36 as being in parallel to the first branched wire part 32, but this is not an essential configuration. The extension directions of the first branched wire part 32, the second branched wire part 36 and the third branched wire part 38 that are maintained by the first branched wire covering part 46, the second branched wire covering part 56 and the third branched wire covering part 58 can be set in any direction. For example, it is conceivable for the extension direction of the third branched wire part 38 to be parallel to the first branched wire part 32. Also, for example, it is conceivable for the first branched wire part 32, the second branched wire part 36 and the third branched wire part 38 to extend in different directions to each other in one plane. The example shown in FIG. 3 shows a wiring member 110 in which the second branched wire covering part 156 of the second maintaining part 152 maintains the routing of a second branched wire part 136, such that the first branched wire part 32, the second branched wire part 136 and the third branched wire part 38 extend in different directions to each other in one plane.

In addition, for example, it is conceivable that the extension directions of the first branched wire part 32, the second branched wire part 36 and the third branched wire part 38 are three-dimensional rather than being in the same plane. As such a wiring member, it is conceivable that, for example, the second maintaining part 52 of the wiring member 10 is formed so as to be rotated about an axis along the second bundled wire part 34 with respect to the first maintaining part 42. Such a wiring member can, for example, be formed by the direction in which the injection mold for the first maintaining part is removed and the direction in which the injection mold for the second maintaining part is removed being set to intersect. Even in the case where the extension directions of the first branched wire part 32, the second branched wire part 36 and the third branched wire part 38 are three-dimensional, it is conceivable for the first branched wire part 32 to be parallel to the second branched wire part 36 or the third branched wire part 38, or for the first branched wire part 32, the second branched wire part 36 and the third branched wire part 38 to extend in different directions to each other.

Also, the embodiment describes the resin molded part 40 as waterproofing the end part 28 of the sheath 27, but this is not an essential configuration. The case is also possible where the resin molded part 40 does not have a function of waterproofing the end part 28 of the sheath 27.

Also, the embodiment describes the wiring member 10 as being provided with the six electrical wires 20, 21, 22, 23, 24 and 25, but this is not an essential configuration. The wiring member may be provided with three to five electrical wires, or may be provided with seven or more electrical wires. In the case where the wiring member is provided with seven or more electrical wires, the seven or more electrical wires may be provided due to electrical wires for active suspension being employed, or the seven or more electrical wires may be provided due to electrical wires for sensors being employed, for example.

In the above embodiment and variations, the plurality of electrical wires may all be power lines, or the plurality of electrical wires may all be signal lines. Also, in the case where the plurality of electrical wires are a combination of power lines and signal lines, any number may be signal lines and any number may be power lines. For example, electrical wires for active suspension or electrical wires for sensors may be employed, instead of electrical wires for an EPB.

Also, the embodiment describes the attachment member 70 as being provided on the resin molded part 40, but this is not an essential configuration. It is also conceivable for the attachment member 70 to not be provided on the resin molded part 40. Also, even in the case where the attachment member 70 is provided on the resin molded part 40, the position of the connection part 45 that is formed in the resin molded part 40 is not limited to the above-described position. For example, the connection part 45 may be formed in the second maintaining part instead of the first maintaining part, and the attachment member 70 may be provided on the second maintaining part. Also, for example, the attachment member 70 may be provided on both the first maintaining part 42 and the second maintaining part.

Also, even in the case where the attachment member 70 is provided on the resin molded part 40, the attachment member 70 being externally mounted to the resin molded part 40 is not an essential configuration. For example, the attachment member 70 may be connected in a state where the second attachment part thereof is buried in the connection part 45. In this case, the resin molded part 40 may be insert-molded using an injection mold with the second attachment part of the attachment member 70 also as an insert target portion. Also, for example, the attachment member may be integrally molded with the resin molded part. In this case, the first attachment part 72 of the attachment member may be integrally molded with the connection part of the resin molded part so as to extend from the connection part, or may be integrally molded with another portion of the resin molded part. Furthermore, even in the case where the attachment member 70 is externally mounted to the resin molded part 40, the shape of the attachment member 70 is not limited to that described above. The first attachment part need only be formed so as to be attachable to the attachment target, and may, for example, be formed in a clip shape that can be inserted into and engaged with a hole formed in the attachment target. Also, the second attachment part need only be formed so as to be attachable to the resin molded part 40, and may, for example, be formed in a shape including a band part that can be wound around the resin molded part 40 and a band engaging part capable of engaging the tip of the band part.

Also, the embodiment describes the resin molded part 40 as being integrally molded such that the first maintaining part 42 and the second maintaining part 52 are directly joined, but this is not an essential configuration. For example, the resin molded part 40 may be integrally molded, such that a coupling part that does not maintain the routing of the second bundled wire part 34 is further included between the first maintaining part 42 and the second maintaining part 52. More specifically, the coupling part is joined, at a first end part thereof, to the second bundled wire covering part 48 of the first maintaining part 42, and, at a second end part thereof, to the second bundled wire covering part 54 of the second maintaining part 52, and covers an intermediate part of the second bundled wire part 34. The coupling part does not, for example, maintain the routing of the intermediate part of the second bundled wire part 34, since the thickness thereof is less than the second bundled wire covering part 48 of the first maintaining part 42 and the second bundled wire covering part 54 of the second maintaining part 52. In other words, the second bundled wire part with the coupling part is readily bendable at the coupling part.

Note that the respective configurations described in the embodiment and the variations can be combined as appropriate as long as there are no mutual inconsistencies.

Although this disclosure has been described in detail above, the descriptions above are in all respects illustrative, and the disclosure is not limited to those descriptions. It should be understood that innumerable variations that are not described herein can be envisaged without departing from the scope of the disclosure.

What is claimed is:

1. A wiring member in which a first bundled wire part that bundles a plurality of electrical wires branches into a first branched wire part and a second bundled wire part at a first branch position, and the second bundled wire part branches into a second branched wire part and a third branched wire part at a second branch position, the wiring member comprising:
   a resin molded part including:
   a first maintaining part that bounds and contacts an outer surface of the electrical wires at the first branch position, and maintains and fixes the electrical wires along a first extension direction, at the first branch position, of the first branched wire part so as to retain the first branched wire part in a rigid manner; and
   a second maintaining part that bounds and contacts an outer surface of the electrical wires at the second branch position so as to bound and contact an outer surface of the second branch wire part and the third branch wire part, and maintains and fixes the electrical wires along a second extension direction, at the second branch position, of the second branched wire part so as to retain the second branched wire part in a rigid manner and maintains and fixes the electrical wires along a third extension direction of the third branched wire part so as to retain the third branched wire part in a rigid manner, the first maintaining part and the second maintaining part being formed as a unitary piece; and
   wherein the first maintaining part and the second maintaining part form a liquid-tight contact, completely contacting an outer perimeter surface of the first branched wire part and the second bundled wire part which are seated within the resin molding part.

2. The wiring member according to claim 1, further comprising:
a sheath that covers the plurality of electrical wires,
wherein the first maintaining part covers an end part of the sheath, the first maintaining part forming a liquid-tight contact with an outer perimeter surface of the end part of the sheath.

3. The wiring member according to claim 1, wherein a connection part to which an attachment member for attaching the wiring member to an attachment target is to be connected is formed in the resin molded part.

4. The wiring member according to claim 1, wherein the extension direction of the first branched wire part maintained by the first maintaining part and the extension direction of the second branched wire part or the third branched wire part maintained by the second maintaining part are parallel.

5. The wiring member according to claim 1, wherein the first extension direction of the first branched wire part maintained by the first maintaining part and the respective second and third extension directions of the second branched wire part and the third branched wire part maintained by the second maintaining part are all different directions.

6. The wiring member according to claim 2, wherein a connection part to which an attachment member for attaching the wiring member to an attachment target is to be connected is formed in the resin molded part.

7. The wiring member according to claim 2, wherein the extension direction of the first branched wire part maintained by the first maintaining part and the extension direction of the second branched wire part or the third branched wire part maintained by the second maintaining part are parallel.

8. The wiring member according to claim 3, wherein the extension direction of the first branched wire part maintained by the first maintaining part and the extension direction of the second branched wire part or the third branched wire part maintained by the second maintaining part are parallel.

9. The wiring member according to claim 2, wherein the first extension direction of the first branched wire part maintained by the first maintaining part and the respective second and third extension directions of the second branched wire part and the third branched wire part maintained by the second maintaining part are all different directions.

10. The wiring member according to claim 3, wherein the first extension direction of the first branched wire part maintained by the first maintaining part and the respective second and third extension directions of the second branched wire part and the third branched wire part maintained by the second maintaining part are all different directions.

11. The wiring member according to claim 1, wherein a coating of the electrical wires of the second bundled wire part is directly covered, at the second branch position, by the second maintaining part.

12. A vehicular wiring member in which a first bundled wire part that bundles a plurality of electrical wires branches into a first branched wire part and a second bundled wire part at a first branch position, and the second bundled wire part branches into a second branched wire part and a third branched wire part at a second branch position, the wiring member comprising:
a resin molded part including:
a first maintaining part that bounds and contacts an outer surface of the electrical wires at the first branch position, and maintains and fixes the electrical wires along a first extension direction, at the first branch position, of the first branched wire part so as to retain the first branched wire part in a rigid manner; and
a second maintaining part that bounds and contacts an outer surface of the electrical wires at the second branch position so as to bound and contact an outer surface of the second branch wire part and the third branch wire part, and maintains and fixes the electrical wires along a second extension direction, at the second branch position, of the second branched wire part so as to retain the second branched wire part in a rigid manner and maintains and fixes the electrical wires along a third extension direction of the third branched wire part so as to retain the third branched wire part in a rigid manner, the first maintaining part and the second maintaining part being formed as a unitary piece; and
wherein an end part that is one end part of the plurality of electrical wires of the vehicular wiring member on the first bundled wire part side is connected to a site on a vehicle body side, and an end part that is an other end part of the plurality of electrical wires on the first branched wire part, second branched wire part and third branched wire part sides is connected to a site on a wheel side, and
the first maintaining part and the second maintaining part form a liquid-tight contact, completely contacting an outer perimeter surface of the first branched wire part and the second bundled wire part which are seated within the resin molding part.

13. The vehicular wiring member according to claim 12, wherein a coating of the electrical wires of the second bundled wire part is directly covered, at the second branch position, by the second maintaining part.

* * * * *